Sept. 21, 1954    C. F. FRYE    2,689,363
AUTOMATIC STOP AND TIMER FOR MACHINE TOOL CONTROL
Original Filed Dec. 16, 1946    3 Sheets-Sheet 1

Sept. 21, 1954  C. F. FRYE  2,689,363
AUTOMATIC STOP AND TIMER FOR MACHINE TOOL CONTROL
Original Filed Dec. 16, 1946  3 Sheets-Sheet 2

Inventor:
Charles F. Frye
By Donald H. Sweet
Atty.

Sept. 21, 1954            C. F. FRYE            2,689,363

AUTOMATIC STOP AND TIMER FOR MACHINE TOOL CONTROL

Original Filed Dec. 16, 1946            3 Sheets-Sheet 3

Inventor:
Charles F. Frye
By Donald H. Sweet
Atty.

Patented Sept. 21, 1954

2,689,363

UNITED STATES PATENT OFFICE 2,689,363

AUTOMATIC STOP AND TIMER FOR MACHINE TOOL CONTROL

Charles F. Frye, Chicago, Ill.

Original application December 16, 1946, Serial No. 716,543, now Patent No. 2,652,732, dated September 22, 1953. Divided and this application October 8, 1948, Serial No. 53,453

5 Claims. (Cl. 121—45)

My invention relates to automatic controls for machinery.

When it is desired to drill a blind hole to a predetermined depth, an automatic trip that throws out a feed operating at constant speed cannot be operated reliably to get a constant depth, and the depth of successive holes will vary by several thousandths of an inch. With the force-sensitive timed feed according to the invention, it is possible for an inexperienced operator to drill blind holes, and the automatic features of the control will give holes of exactly identical depth with an accuracy down to precision tolerances.

This application is a division of my co-pending application, Serial Number 716,543, filed December 16, 1946, now Patent Number 2,652,732, dated September 22, 1953.

Figure 1:
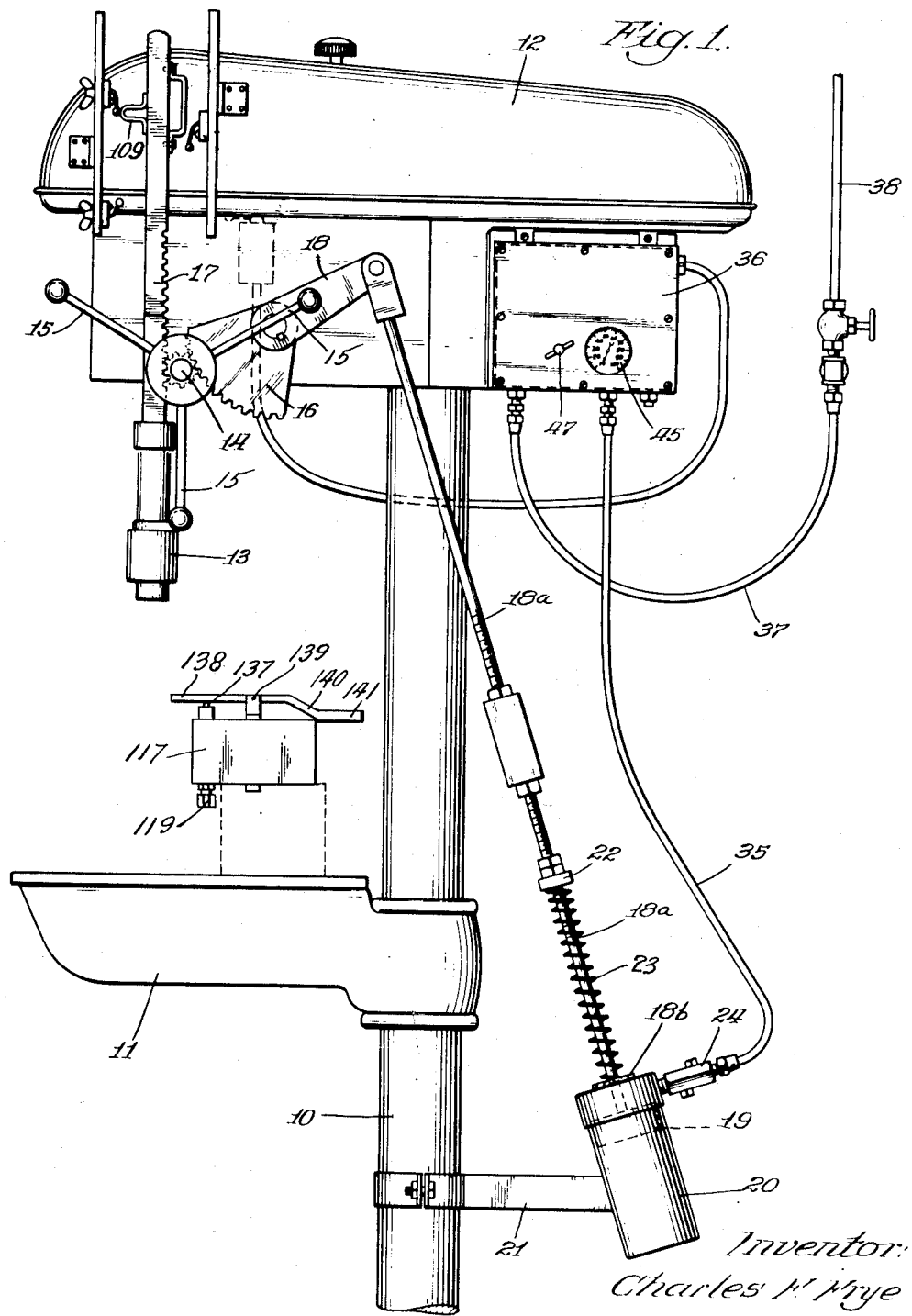
Figure 1 is a side elevation of a drill press.

The conventional drill press includes the standard 10, work table 11, power head 12, and spindle 13, which may be reciprocated vertically by rotating the cross shaft 14 provided with three equally spaced radial handles 15 for the convenience of the operator. This also activates the pivoted sector 16 meshing with the same pinion on shaft 14 which engages the teeth of the rack 17 to move the spindle 13. The sector 16 also carries a crank arm 18 connected by means of an adjustable pitman 18a extending down through a conventional packing 18b to connect with the piston 19 in the cylinder 20. The cylinder may be suitably supported in any desired position as by means of a bracket 21. The pitman 18a carries an abutment 22 receiving the thrust of the compression spring 23 to hold the parts in the position shown in the drawings.

Air under pressure may be introduced into the cylinder 20 to force the piston 19 down and actuate the spindle 13. The compressed air supply is indicated at 38. It passes through a pipe 37 to a control box 36, which may include conventional pressure-reducing means, adjustable by the handle 47, and a gauge 45, to indicate to the operator what pressure is being delivered through the pipe 35 and fitting 24 to the working cylinder.

Air under pressure is received through the connector 44 and conveyed to a conventional pressure reducing valve 46, the adjusting handle 47 of which projects through the cover of the housing 39 to be accessible to the operator. From the pressure reducing valve, the air at reduced pressure enters the control block 48 at the inlet 49. The gauge 45 is provided for the convenience of the operator in knowing what pressure he is getting.

Figure 2:
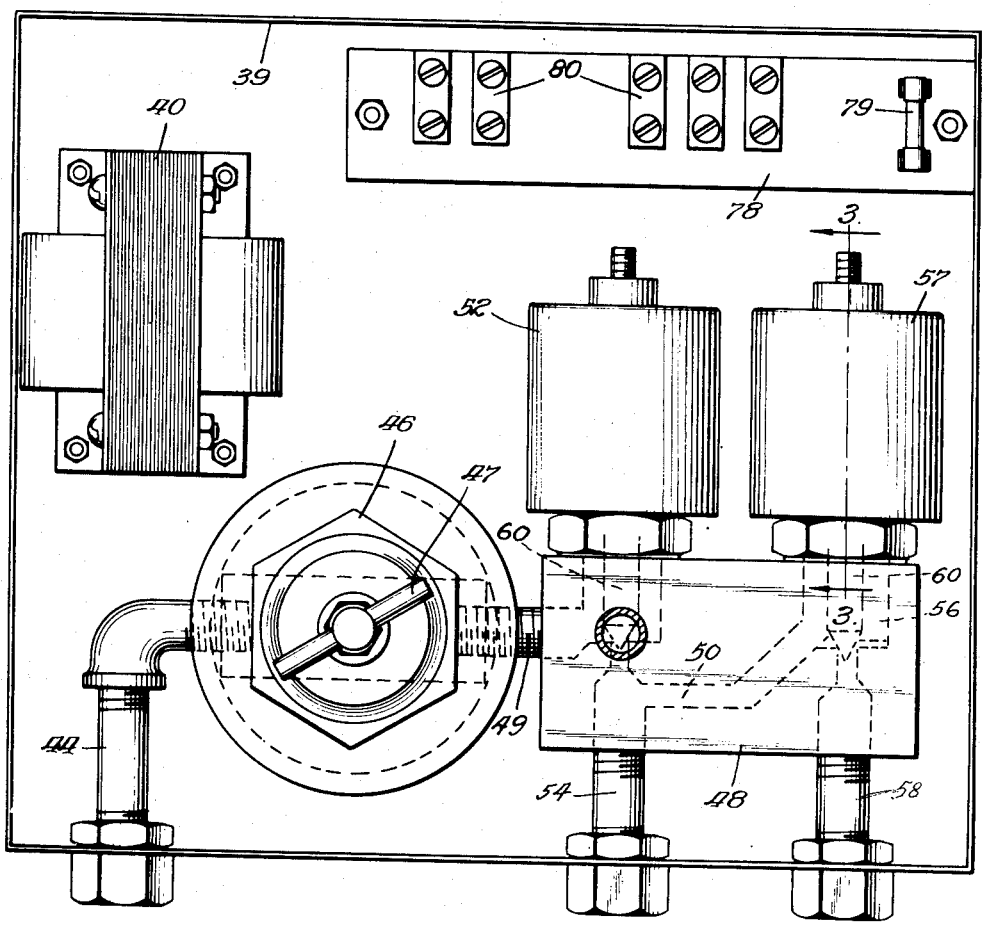
Figure 2 is an enlarged elevation of the control box of Figure 1 with the cover removed.

From the inlet 49 the air may find its way to the horizontal passage 50 subject to control by a first solenoid valve 52. The passageway 50 always connects at 54 to the actuating cylinder and to the chamber 56 controlled by the right solenoid valve 57. Each of the solenoids 52 and 57 lifts or drops its valve element proper 60 (see Figure 2). It will be apparent that with the left solenoid valve 52 open and the right closed, operating pressure will be delivered to the cylinder. But if the relationship is reversed, the passageway 50 no longer receives air under pressure, being cut off from the inlet 49, and functions as a discharge passage through the chamber 56 and exhaust opening 58. The insulating panel 78 carries a fuse 79 and terminals 80 for low voltage wiring connections, energized by the step-down transformer 49.

Figure 4:
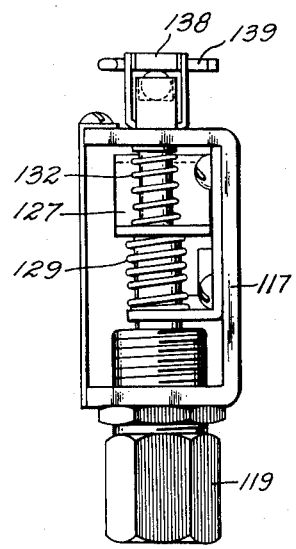
Figure 4 is an end view of the switch of Figure 3.
Figure 5:
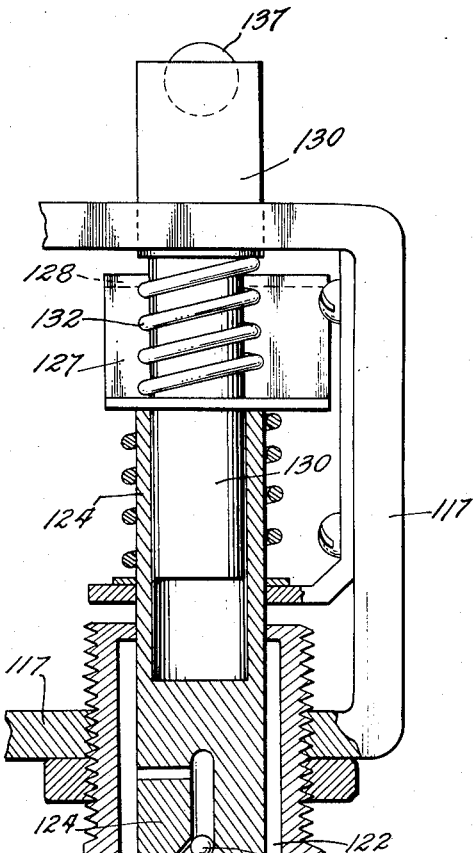
Figure 5 is a similar view, partly in section on line 5—5 of Figure 3.
Figure 3:
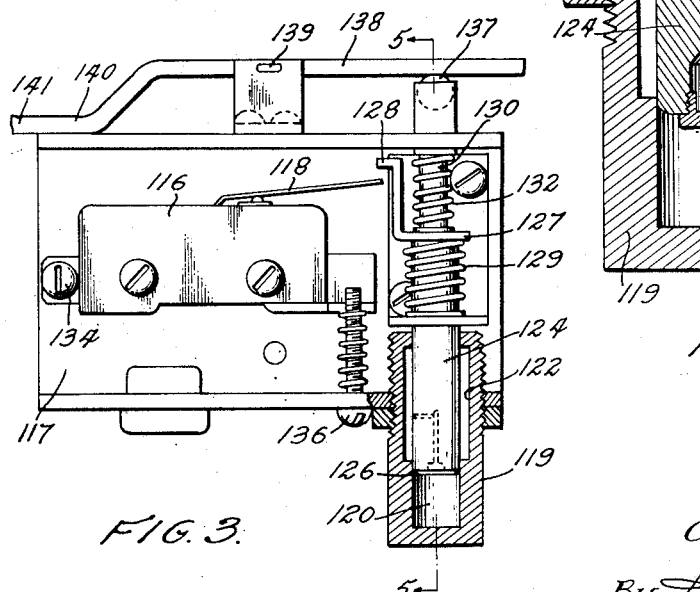
Figure 3 is a side elevation of a mechanical reset timing switch.

Referring now to Figures 3, 4, and 5, I have indicated a microswitch 116 housed in a suitable channel-shaped support 117 and operated to open and close a circuit by pressure on the finger 118, for transferring energizing current from solenoid 52 to solenoid 57. To actuate the finger I provide a timing mechanism involving an oil-filled dash-pot 119 having a working space 120 and an enlarged bore 122 above the working space. The plunger 124 is a loose fit in the working space 120 and is provided with a vent passage, including a check valve 126, which permits liquid to flow into the working chamber but not out of it. The upper end of the plunger carries a bracket 127 having a projection 128 overlying the end of the finger 118 to depress the same. The plunger and bracket are held up in the position of Figure 2 by a compression spring 129. The push rod 130 telescopes freely in the plunger 124 and carries an abutment for the upper end of the compression spring 132, the lower end of which bears on the upper end of the plunger 124.

It will be apparent that if the push rod 130 is forced down, the increased tension of the spring 132 will result in an unbalanced force to move the plunger 124 down, but this movement will be damped by the liquid in the working space, which has to leak up around the sides of the plunger.

Thus it is easy to design the parts so that a period of from two to as much as fifteen seconds elapses before the projection 128 has moved down to the limit of its movement. By pivoting the microswitch at 134 and adjusting its position with the adjusting screw 136, the position of the finger 118 may be shifted to secure any desired delay within the capacity of the device.

Means are provided for depressing the plunger 130 when the tool comes to the end of its desired path of movement. I have indicated a ball contact 137 at the upper end of the push rod 130 and a rocking lever 138 pivoted at 139. The rocking lever may be positioned where a suitable projection from a tool carriage or spindle, such as the spindle 13 of Figure 1, will engage it, and is of sufficient mechanical strength to hold the spindle against movement under the force of the actuating piston. I have indicated a heel 140 to limit the movement of the lever 138 in the other direction. By extending the heel 140 at 141, convenient mechanical contact is provided for machine elements moving in either direction.

When it is desired to feed any tool, such as a drill, end broach or milling cutter, so that it will cut into the work up to a predetermined point with a high degree of precision, and leave a cut surface that is smooth and uniform throughout, the equipment of Figures 3, 4, and 5 may be employed in such a way that the tool carriage moves with a high degree of precision to a predetermined position and remains in that predetermined position for a predetermined time, which may amount to several seconds, while the cutting tool continues to turn against the work and load distortions of the frame of the machine are relieved. Then, when the microswitch is closed and the tool backs away, it will be found that the bottom of the hole or the end of the cut has been finished with precision.

It will be apparent that because the feeding instrumentality is force-sensitive and hesitates momentarily and only exerts a predetermined maximum feeding force, no harm is done if the tool carrier is arrested with a fixed stop at any time, either to discontinue the feed or to postpone it while some other operation is taking place.

Thus, the right or left end of the lever 138 is the effective stop member, and is displaced by contact with the spindle 13 or other tool carriage, and the lever 138 rotates clockwise until its right end strikes the channel 117. This holds the spindle firmly and accurately in a predetermined position until the dash-pot 120 lets the finger 128 get down far enough to actuate the switch lever 118, and the feed is reversed. The displacement of the lever before its limit of movement is reached stores energy in spring 132, and the gradual dissipation of that energy into compression of spring 129 and into displacement of the oil performs the timing function.

Others may readily adapt the invention for use under various conditions of service by employing one or more of the novel features involved, or equivalents thereof. As at present advised with respect to the apparent scope of my invention, I desire to claim the following subject matter.

1. Automatic timed dwell equipment for machine tools comprising, in combination with a conventional machine tool having a work support element and a tool carrier element; feed means for moving one of said elements with respect to the other, including a pneumatic transmission, capable of exerting not more than a predetermined maximum feeding force; stop means including a stop member mounted on a first one of said elements in a position to engage and be displaced by the relative movement of the other, second element; said stop means including a fixed mounting part rigid with the first element; a limited lost-motion connection between said stop member and said fixed part; resilient means biasing said stop member toward said second element; energy-storage means actuated by said stop member when displaced by said other element, for storing mechanical energy; movable dissipating means connected between said stop member and said fixed part, for slowly dissipating the energy thus stored; an electric switch including an actuating element lying in the path of movement of said dissipating means; operator-controlled means for adjusting the position of said actuating element in a direction parallel to the path of movement of said dissipating means, to vary the time interval intervening after feed is stopped and before said switch is actuated; and feed reversing means rendered operative by actuating said electric switch.

2. Automatic timed dwell equipment for machine tools comprising, in combination with a conventional machine tool having a work support element and a tool carrier element; feed means for moving one of said elements with respect to the other, including a transmission capable of exerting not more than a predetermined maximum feeding force; stop means including a stop member mounted on a first one of said elements in a position to engage and be displaced by the relative movement of the other, second element; said stop means including a fixed mounting part rigid with said first element; a limited lost-motion connection between said stop member and said fixed part; resilient means biasing said stop member toward said second element; energy-storage means actuated by said stop member when displaced by said other element, for storing mechanical energy; movable dissipating means for slowly dissipating the energy thus stored; an electric reversing switch including an actuating element lying in the path of movement of said dissipating means; operator-controlled means for adjusting the position of said actuating element in a direction parallel to the path of movement of said dissipating means, to vary the time interval intervening after feed is stopped and before said switch is actuated.

3. Automatic timed dwell equipment according to claim 2, in which said switch is in a housing with said actuating element projecting from the housing, and said adjusting means operates by displacement of the entire housing and contents.

4. Automatic timed dwell equipment according to claim 2, in which said dissipating means is a plunger, a dash-pot receiving one end of said plunger, and spring means normally holding said plunger in withdrawn condition, and said energy-storing means is an opposing spring positioned to be stressed by the movement of said stop member toward said fixed mounting part.

5. Automatic timed dwell equipment according to claim 4, in which said dash-pot and plunger are provided with an inlet passage and an inwardly opening check valve in said passage, whereby the parts can return to original position quickly.

References Cited in the file of this patent

UNITED STATES PATENTS

| Number | Name | Date |
|---|---|---|
| 148,558 | Goble | Mar. 17, 1874 |
| 213,903 | Hoyt | Apr. 1, 1879 |
| 291,818 | Tudor | Jan. 8, 1884 |
| 389,097 | Newman | Sept. 4, 1888 |
| 390,960 | Gustin | Oct. 9, 1888 |
| 893,527 | Lawler | July 14, 1908 |
| 1,059,013 | Urquhart | Apr. 15, 1913 |
| 1,152,433 | Murphy | Sept. 7, 1915 |
| 1,720,896 | Haderman | July 16, 1929 |
| 1,885,070 | Balsiger | Oct. 25, 1932 |
| 2,084,562 | Schafer | June 22, 1937 |
| 2,111,385 | Boothroyd | Mar. 15, 1938 |
| 2,209,608 | Nye et al. | July 30, 1940 |
| 2,307,544 | Robinson | Jan. 5, 1943 |
| 2,324,727 | Shartle | July 20, 1943 |
| 2,338,365 | Thorp | Jan. 4, 1944 |
| 2,359,168 | Somes et al. | Sept. 26, 1944 |
| 2,421,149 | Hard af Segerstad | May 27, 1947 |
| 2,431,747 | Frye | Dec. 2, 1949 |
| 2,460,695 | Hennessy | Feb. 1, 1949 |